(12) United States Patent
Schmid et al.

(10) Patent No.: US 10,895,481 B2
(45) Date of Patent: Jan. 19, 2021

(54) METHOD AND DEVICE FOR MEASUREMENT OF LIQUID VOLUME AND/OR FLOW RATE

(71) Applicant: CSEM Centre Suisse d'Electronique et de Microtechnique SA Recherche et Développement, Neuchâtel (CH)

(72) Inventors: David Schmid, Untervaz (CH); Silvia Generelli, Chur (CH); Fiona Pereira, Garland Close (GB)

(73) Assignee: CSEM CENTRE SUISSE D'ELECTRONIQUE ET DE MICROTECHNIQUE SA—RECHERCHE ET DÉVELOPPEMENT, Neuchâtel (CH)

( * ) Notice: Subject to any disclaimer, the term of this patent is extended or adjusted under 35 U.S.C. 154(b) by 311 days.

(21) Appl. No.: 15/921,267

(22) Filed: Mar. 14, 2018

(65) Prior Publication Data

US 2019/0285452 A1    Sep. 19, 2019

(51) Int. Cl.
    *G01F 1/00*      (2006.01)
    *G01F 1/69*      (2006.01)
    *G01F 1/698*     (2006.01)

(52) U.S. Cl.
    CPC ............ *G01F 1/69* (2013.01); *G01F 1/6986* (2013.01)

(58) Field of Classification Search
    CPC .................................. G01F 1/69; G01F 1/6986
    USPC ...................................................... 73/204.25
    See application file for complete search history.

(56) References Cited

U.S. PATENT DOCUMENTS

| | | | |
|---|---|---|---|
| 2003/0215334 A1 * | 11/2003 | Effenhauser | F04B 19/006 417/52 |
| 2014/0208824 A1 | 7/2014 | Baechi | |
| 2018/0353748 A1 * | 12/2018 | Heikenfeld | A61B 5/14521 |

FOREIGN PATENT DOCUMENTS

| | | | | |
|---|---|---|---|---|
| GB | 2358971 A | * | 8/2001 | ............ A47J 27/212 |
| WO | 01/56436 A2 | | 8/2001 | |
| WO | 2017/019602 A1 | | 2/2017 | |

OTHER PUBLICATIONS

Xiaoze Du et al.: "Continuous micro liquid delivery by evaporation on a gradient-capillary microstructure surface", Journal of Micromechanics & Microengineering, Institute of Physics Publishing, Bristol, GB, (Jul. 29, 2011), vol. 21, No. 9, doi:10.1088/0960-1317/21/9/095004, ISSN 0960-1317, p. 95004, XP020210103 [X] 1-4,7-10 * Sections 2, 5 and 6;; figures 6, 7; table 1.

(Continued)

*Primary Examiner* — Jamel E Williams
(74) *Attorney, Agent, or Firm* — Nixon & Vanderhye (57) ABSTRACT

Disclosed is a method for liquid measurements including: —providing a sensor including a surface arranged to receive a liquid thereupon, an electrical heating element arranged to heat the surface, and an arrangement for measuring a temperature of the surface; —receiving liquid on the sensor surface; —heating the surface by means of the electrical heating element at a known rate while taking a plurality of temperature measurements thereof in function of time, the heating being at an absolute temperature of at least 90% of the boiling point of the liquid under ambient pressure; and—deriving a volume or a flow rate measurement related to the liquid from the electrical heating rate and the temperature measurements.

19 Claims, 7 Drawing Sheets

(56) References Cited

OTHER PUBLICATIONS

Nie Chuan et al.: "A microfluidic device based on an evaporation-driven micropump", Biomedical Microdevices, Kluwer, Dordrecht, NL, vol. 17, No. 2, doi:10.1007/S10544-015-9948-7, ISSN 1387-2176, (Mar. 25, 2015), pp. 1-12, (Mar. 25, 2015), XP035499142.
EP Search Report, dated Sep. 19, 2017, from corresponding EP 17 16 0730 application.
Du Bois, D. and Du Bois, E., "A Formula to Estimate the Approximate Surface Area if Height and Weight be Known," Archives of Internal Medicine, 17, pp. 863-871, 1916.
Imhof, R.E. et al., "Closed-chamber transepidermal water loss measurement: microclimate, calibration and performance," International Journal of Cosmetic Science, 2009, 31, pp. 97-118.
Morris, D. et al., "Bio-sensing textile based patch with integrated optical detection system for sweat monitoring," Sensors and Actuators B, 139, Feb. 27, 2009, pp. 231-236.
Mosteller, R.D., "Simplified calculation of body-surface area," New England Journal of Medicine 317(17), p. 1098, Oct. 22, 1987.
Nilsson, G.E, "Measurement of water exchange through skin," Medical & Biological Engineering & Computing, 15, pp. 209-218, 1977.
Salvo, P., "Wearable technologies for sweat rate and conductivity sensors: design and principles," PhD thesis CNR Pisa, Italy, Institute of Clinical Physiology, 2013.

\* cited by examiner

METHOD AND DEVICE FOR MEASUREMENT OF LIQUID VOLUME AND/OR FLOW RATE

TECHNICAL FIELD

The present invention relates to the technical field of liquid measurements. More particularly, it relates to a method and a corresponding device for measuring relatively small liquid volumes and/or flow rates.

State of the art

Measurement of small liquid volumes and/or flow rates involving relatively small amounts of liquid is important in, for instance, investigation of sweating, in microfluidic analysis, and in other roles.

The publication *Closed-chamber transepidermal water loss measurement: microclimate, calibration and performance*, Imhof et al, Int J Cosmet Sci. 2009 April; 31(2):97-118, proposes a closed-chamber transdermal water loss measurement system. This system comprises an open-ended chamber which is placed on the skin of a subject so as to form a closed chamber, and comprises a relative humidity and temperature sensor situated inside the chamber. Measurements of the relative humidity and temperature as a function of time permit calculation of the sweating rate of the skin confined by the chamber, and by extrapolation the overall sweating rate of the person can be estimated.

However, since the chamber is closed, the air inside quickly saturates with water vapour from the person's sweat, and the accuracy of the measurement drops off rapidly. Long-term sweat rate measurements, e.g. extending over several hours or days, are thus difficult or impossible to perform accurately. Furthermore, this sensor cannot easily be adapted to measuring other liquid flow rates.

The document US2014/208824 describes a method of measuring small liquid volumes in microwell plates, which involves heating the liquid with a known quantity of thermal energy, and measuring the resulting temperature rise. From the energy applied and the temperature rise measured, the volume of liquid can be determined. However, since this method relies simply on measuring temperature differences, it presumes that evaporation of the sample is trivial and can thus be ignored. Indeed, the temperature changes used are from 1K to 30K for aqueous liquids and from 1K to 50K for oils, which are clearly chosen to minimise evaporation and to prevent sample damage or loss. In fact larger temperature changes are counter-indicated for microwell applications, since they will damage the biological sample whose volume is being measured by denaturing enzymes or killing cells. This method is thus essentially limited to the stated application, and is capable only of carrying out volumetric measurements.

An aim of the invention is thus to propose a method for volumetric and/or flow rate measurements of liquids which overcomes at least partially the above-mentioned disadvantages of the prior art, and are hence suitable for a wide range of applications.

DISCLOSURE OF THE INVENTION

More specifically, the invention relates to method for liquid measurements according to independent claim 1. This method comprises first providing a sensor comprising a surface arranged to receive a quantity of liquid, an electrical heating element arranged to heat said surface, and an arrangement for measuring a temperature of said surface.

Liquid is then received on said sensor surface, either continuously or in discrete amounts, depending on whether flow rate or volume is being measured.

The surface is heated by means of the electrical heating element at a known predetermined or measured rate while taking a plurality of temperature measurements of the surface as a function of time, i.e. at different, known times. This heating is carried out at an absolute temperature of at least 90% of the boiling point of said liquid under ambient pressure, so as to be able to heat the liquid at least to this temperature, if not higher. For instance, the surface which is in contact with the liquid is heated to at least this temperature.

On the basis of parameters relating to the electrical heating and the temperature measurements, a volume or a flow rate measurement related to the liquid is then derived, for instance by determining its volume or flow rate from first principles related to the applied power, time, temperature, specific heat capacity and latent heat of vaporisation of the liquid, or alternatively by applying a previously-determined calibration curve.

As a result, the volume or flow-rate of the liquid on the surface of the sensor can easily and simply be determined, and since the sensor operates in an evaporative mode, the sensor is immediately ready to receive more liquid as the earlier liquid evaporates off. This evaporation can also advantageously be used to help draw fluid through an analysis sensor by creating a humidity gradient, thereby preventing the analysis sensor from clogging with analyte. However, it should be noted that the intention of the method of the invention is primarily to measure unknown volumes and/or flow rates. This is distinct from an evaporative microfluidic pump, which is intended to produce a desired, pre-determined flow rate from an applied heat flux. Such devices and their methods of operation do not measure flow rates or volumes any more than a conventional mechanical pump does so.

Advantageously, the electrical power source may be provided with a predetermined electrical current from a power source. By using a current source rather than a voltage source, the calculation of applied power is simplified if the electrical resistance of the heating element is known.

Advantageously, said temperature may be measured by measuring the electrical resistance of said electrical heating element. The electrical heating element thus serves not only as a source of heat, but also as its own arrangement for measuring temperature. This requires knowing the relationship between temperature and resistance of the electrical heating element, however it eliminates the requirement for a separate temperature-measuring element such as a thermistor. The electrical resistance can be measured by providing a known current to said electrical heating element while measuring the voltage drop thereacross, the resistance being calculated by Ohm's Law. This result can then be converted into temperature by means of a calibration curve, look-up table or similar.

Advantageously, the above-mentioned heating may be carried out as a series of heating pulses of predetermined duration, each preferably being sufficiently long to dry said surface. The flow rate of liquid can then be determined by these repeated measurements, the above-mentioned measurements being used to calculate flow rate a priori, or by means of a previously-determined calibration curve.

Alternatively, the heating may be carried out by applying power at a predetermined rate insufficient to dry said surface, a flow rate measurement being derived from a steady state temperature measured. Since this steady state temperature represents an equilibrium state in which the power applied balances the amount of energy being removed by evaporation, the flow rate can be derived based on the power applied and the temperature reached. For instance, the power can be applied at a predetermined rate, and the equilibrium temperature measured. Changes in flow rate will change this equilibrium temperature. Alternatively, the electrical power applied may be varied in order to maintain a predetermined steady state temperature, the power applied being used to derive the flow rate based on conservation of energy, or by using a calibration curve.

In respect of measurement of unknown flow rates, the use of the method for measuring e.g. sweating rates is particularly interesting, or for verifying the flow rate of a microfluidic pump. Furthermore, in the case of volumetric measurements, the measurement of the size of a droplet of liquid provided by a pipetting apparatus or a syringe so as to verify the calibration of the pipetting apparatus or syringe is also particularly interesting. In this latter case (or in any other case relating to measuring the unknown size of droplets), one or more droplets may be pipetted onto said surface so as to form one or more individual, discrete droplets thereupon, the method of the invention being used to measure the total volume thereof. In the case of verification, this measured volume can then be compared with the intended dispensing volume of the pipetting system or syringe.

It should be noted that the above-mentioned features of the method according to the invention can be combined in any combination which makes technical sense.

The invention also relates to a sensor system adapted to carry out any of the above-described methods.

This system includes a sensor comprising a surface adapted to receive a quantity of fluid thereupon, an electrical heating element arranged to be connected to a source of electrical power, as well as an arrangement for measuring temperature which, as above, may be a separate temperature sensor such as a thermistor, or may be an arrangement exploiting measurement of the resistance of the electrical heating element. The system also comprises a conduit adapted to collect a liquid sample and to transport it to said surface. This conduit may be a tube acting by capillary action or subject to a pumping action, a height difference or similar source of pressure head, or it may be a wicking fabric that transports liquid by capillary action.

Again, the volume or flow rate measured is typically unknown, and the system is hence not an evaporative microfluidic pump, which does not measure volumes or flow rates, but rather actively provides them.

Advantageously, the arrangement for measuring temperature is integrated with the electrical heating element as mentioned above, which results in a particularly compact system due to the absence of a separate thermistor or similar.

Advantageously, at least a part of said conduit may comprise a wicking fabric in fluid communication with the surface of the sensor, and which is arranged to be sandwiched between said sensor and a skin surface. A compact sensor system suitable for sweat rate measurements that can be worn on the skin can thus be constructed. This conduit advantageously extends around a peripheral wall of said sensor so as to form at least one fluid pathway leading to said surface.

Advantageously, the sensor system may further comprise a substantially impermeable cover arranged to at least partially seal said sensor system to said skin surface. This cover, which may be adhesive, serves to prevent undesired loss of liquid, ensuring that substantially all liquid reaches the surface of the sensor. The cover may be at least partially self-adhesive, so as to securely attach the sensor system to the skin of a wearer.

Advantageously, the sensor system further comprises an analysis sensor, such as a biological or chemical assay sensor, in fluid communication with said conduit and arranged such that said liquid passes through said analysis sensor before being received on the surface of the volume/flow rate sensor. The volume/flow rate sensor thus not only measures the volume or flow rate of liquid passing through the analysis sensor, but also helps draw it through by creating a humidity gradient which enhances capillary flow in the conduit. Clogging of the analysis sensor with analytes is thus reduced or eliminated.

BRIEF DESCRIPTION OF THE DRAWINGS

Further details of the invention will appear more clearly upon reading the description below, in connection with the following figures which illustrate.

EMBODIMENTS OF THE INVENTION

Figure 1:
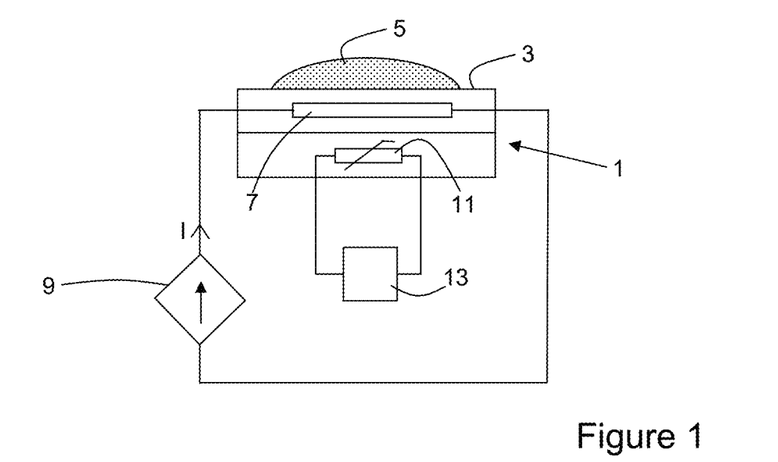
FIG. 1: a schematic diagram of a sensor as used in the method of the invention.

FIG. 1 illustrates schematically the principle of the invention, which revolves around a particular method of using a sensor 1.

Sensor 1 comprises a surface 3 arranged to receive liquid 5 thereupon. This surface 3 may be flat, textured, smooth, or may comprise structures to aid in attracting and retaining liquid 5. For instance, hollows, capillary channels and so on may be provided thereupon. Furthermore, this surface 3 may be interchangeable so as to be replaceable in the case in which it becomes sufficiently coated with solid solutes from the liquid that it no longer functions correctly. In terms of materials, heat-conducting surfaces are preferred, such as metals (copper, brass, steel, aluminium, nickel, gold . . . ), thermally-conductive ceramics (silicon carbide, aluminium nitride, sapphire, alumina), or similar.

Sensor 1 further comprises an electrical heating element 7, provided with electrical energy by means of a power source 9, which in this case is adapted to deliver a predetermined current I.

The sensor 1 also comprises a temperature sensor 11, illustrated here as a thermistor electrically connected to a resistance meter 13. Other forms of temperature sensor 11 are possible. In this setup, the electrical resistance of the electrical heating element 7 is known a priori as a function of temperature.

Figure 2:
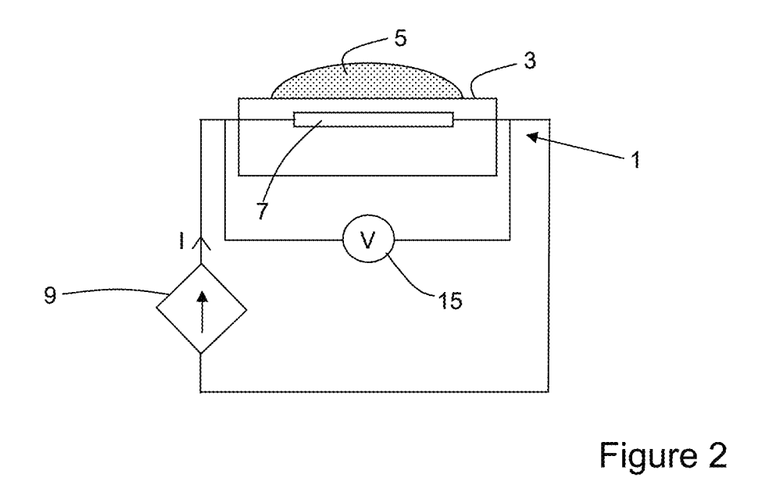
FIG. 2: a schematic diagram of a variant of a sensor as used in the method of the invention.

FIG. 2 illustrates a variant of sensor 1, which uses the electrical heating element 7 itself not only as a source of heat, but also as a temperature sensor. Since the resistance of the electrical heating element 7 itself changes with temperature, by measuring the voltage drop across electrical heating element 7 by means of a voltmeter 15, its temperature can be deduced.

In each case, we know that the heating power supplied can be calculated as:

$$P = I^2 R$$

Wherein P is heating power, I is current, and R is the electrical resistance of the electrical heating element. Power P can be integrated with respect to time to obtain the amount of heat energy Q applied, expressed in joules.

In the arrangement of FIG. 1, R may vary as a function of the temperature of the electrical heating element 7, and a calibration curve may be applied in function of the temperature measured by the temperature sensor 11 to account for this change.

In the arrangement of FIG. 2, the resistance of the electrical heating element 7 does not need to be known a priori, and the heating power supplied can simply be calculated as:

$$P = IV$$

Where P and I are defined as above, and V is the voltage drop across the electrical heating element 7 as measured by the voltmeter 15. Again, the heat energy Q applied can be calculated simply by integrating P with respect to time.

By knowing the rate of application of heat and/or the total heat applied, and the variation of temperature over time, the volume or the flow rate of the liquid 5 can be determined as described in more detail below.

Contrary to the method described in US2014/208824, the present method operates the sensor in an evaporative mode. In other words, the temperature of the sensor 1 is raised to a sufficient degree to force evaporation of the liquid 5. It is this evaporation that is primarily exploited to determine the volume or flow rate of liquid 5, rather than just a simple temperature rise. While at any temperature above freezing in ambient conditions with a relative humidity under 100% evaporation will occur naturally, it is relatively insignificant compared to the forced evaporation used in the method of the invention, in which the absolute temperature of the sample is raised to at least 90% of the absolute-temperature (expressed in Kelvin) boiling point of the liquid (in the absence of solutes) at ambient pressure, by raising the surface 3 of the sensor 1 to at least this temperature. For an aqueous liquid, this corresponds to approximately 63° C., for an ethanol-based sample to at least 43° C., and for a typical white mineral oil, 243° C. However, absolute temperatures up to 100% or even 110% of the boiling point of the liquid 5 (considered without solutes and expressed in absolute temperature in Kelvin) are also possible, particularly in the presence of large concentrations of solutes. It is also possible to use a temperature of at least 93%, at least 95%, at least 97%, or at least 99% of the absolute boiling temperature to the liquid, expressed in Kelvin. In the case of an aqueous liquid, these percentages correspond to approximately 74° C., 81° C., 89° C. and 96° C. respectively.

Firstly, a method for use of the sensor for volumetric measurements will be described. Such a method is useful for e.g. determining the volume of drops of liquid produced by a microfluidic device, a pipetting device, a syringe or similar. This exact volume is clearly unknown, although its likely range may be known a priori. The liquid may thus be provided on the surface 3 as one or more discrete droplets, rather than resulting in a complete immersion of the surface 3. This method is illustrated schematically by the idealised graph of FIG. 3, and heating power is supplied which is sufficient to heat the surface 3 to well above the boiling point of the liquid 5.

Figure 3:
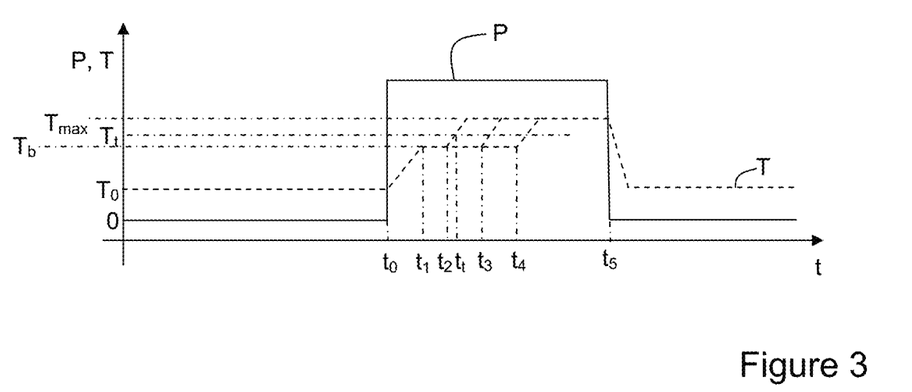
FIG. 3: a schematic graph representing the method of the invention as applied to volumetric measurements.

In this graph, the solid line represents the heating power applied, and the dashed lines represent simplified temperature profiles relating to three different liquid volumes 5. At time to, the temperature measured equals the initial temperature $T_0$, i.e. the temperature of the surroundings. At this point in time, heating power P is applied. Heating power P is typically constant during the heating phase, but does not have to be so, and is sufficient to raise the temperature of the liquid 5 to at least 90% of its boiling temperature as described above. Typically, the sensor is configured to reach an equilibrium surface temperature when dry (i.e. when no liquid is present) which is above the boiling point of the liquid 5 to be measured. This ensures that the sensor 1 is powerful enough to carry out the method correctly. As non-limiting examples, this dry equilibrium surface temperature can be at least 110% of the boiling temperature of the liquid 5, at least 115% thereof, or even at least 120% (or more) thereof.

Between $t_0$ and $t_1$, the heat predominantly causes the temperature of the liquid 5 to rise. As will be seen in more detail below, $t_1$ does not vary significantly in function of the volume of the sample, since a significant excess of heat is applied, and the latent heat of vaporisation of a liquid is significantly higher than its specific heat capacity. This can clearly be seen by comparing the values for water, namely 2257 kJ/kg latent heat of vaporisation and 4.2 kJ/kg·K specific heat capacity. In this case, the specific heat capacity is only around 0.2% of the latent heat of vaporisation.

From $t_1$ until $t_2$ (for the smallest liquid sample illustrated, i.e. the leftmost track on the graph, the times $t_3$ and $t_4$ corresponding to the same point for larger samples), the temperature T remains substantially constant at or near the boiling point $T_b$ of the liquid 5 while this latter evaporates. At $t_2$, the liquid has substantially all evaporated, and the temperature of the sensor 1 rises again until thermal equilibrium with the surroundings is reached at Tmax.

Finally, at $t_5$, the heating phase ends, and the temperature drops back to $T_0$ as the sensor 1 loses heat to its surroundings.

On the basis of the measurements taken (electrical power P, temperature T and time t), the amount of heat energy applied to the liquid 5 can be calculated since its specific heat capacity and latent heat of vaporisation are known.

Integrating the heating power applied between $t_0$ and $t_2$, $t_3$, or $t_4$ (as appropriate) to give the energy absorbed by the liquid, which then permits simple calculation of the mass, and hence the volume of liquid 5, by means of standard specific heat capacity and latent heat of vaporisation calculations that need not be reproduced here.

Figure 4:
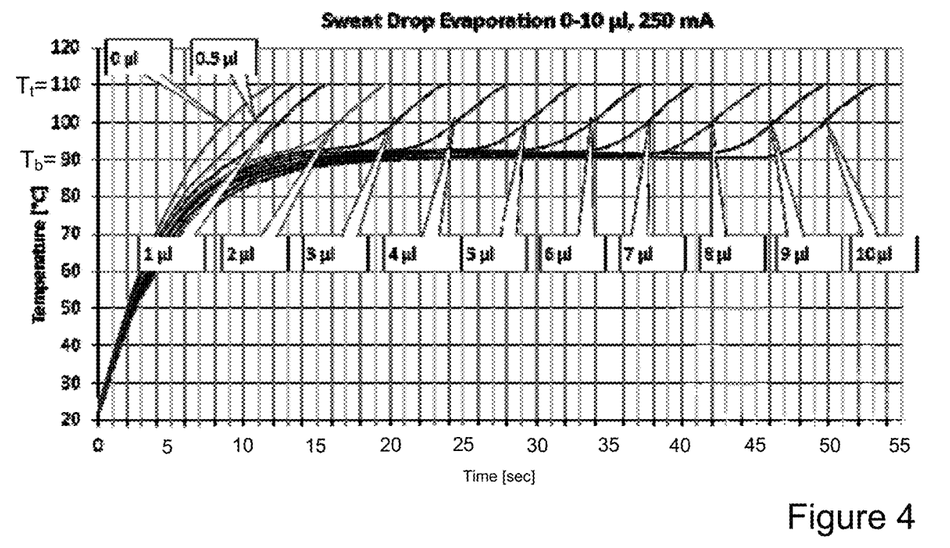
FIG. 4: a graph illustrating measurement data obtained with the method of the invention during calibrated volumetric measurements.

FIG. 4 shows measurement data for evaporation of a sweat drop from 0 to 10 μL volume, with a constant current of 250 mA applied to the heating element 7. As can be seen from this data, the transition from the heating phase ($t_0$-$t_1$) is quite indistinct (and hence the various t points have not been indicated on this graph), which may be exacerbated further due to the presence of dissolved solutes in the liquid sample, such as salt in a sweat drop, and does not serve as a good basis for automated measurement. Furthermore, the exact moment that a given sample has fully evaporated ($t_2$, $t_3$, $t_4$ . . . ) is also indistinct, particularly in the case of smaller samples, rendering calculation by integration of the energy applied to the liquid 5 difficult to perform automatically with good accuracy.

In order to simplify determination of the liquid volume, a calibration curve can be created. This is simpler and often more accurate than calculation from first principles, since this does not require determining the times $t_1$ and $t_2$ on a smooth curve.

Firstly, a threshold temperature $t_t$ is defined which is ideally higher than the boiling temperature $T_b$ of the liquid but lower than the equilibrium temperature $T_{max}$. In the present example, $T_t$ is 110° C., about 5% above the absolute value of $T_b$ expressed in Kelvin. This ensures that the temperature curve crosses the threshold temperature $T_t$ at a distinct, easily-determinable point, at an easily-measurable time $T_t$.

Figure 5:
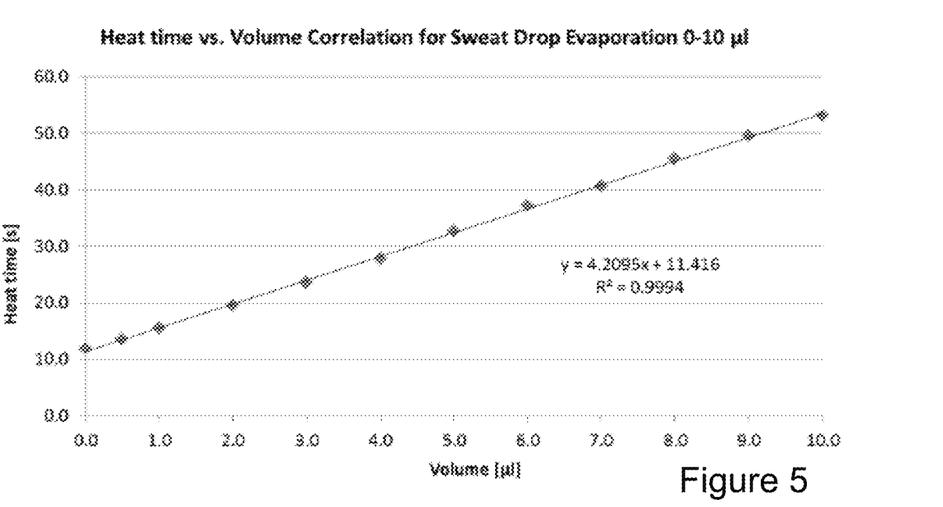
FIG. 5: a graph of a calibration curve obtained from the data illustrated in FIG. 4.

On the basis of the calibrated tests represented in FIG. 4, a calibration curve is calculated, which is represented in FIG. 5. This curve is linear to a high $R^2$ value, and can be represented as:

$$v = \frac{t - k_1}{k_2}$$

In which v is the volume of the liquid, t is the time taken from commencing heating at $t_0$ to crossing the threshold temperature $T_t$ at time $t_t$ (i.e. $t=t_t-t_0$), $k_1$ is a constant relating to the thermal lag of the sensor 1, and $k_2$ is a constant relating to the thermal properties of the liquid.

In the present example, a dry sensor takes 11.4 seconds to reach the threshold temperature, hence $k_1$=11.4, and $k_2$ is determined from the slope of the graph of FIG. 5, which is 4.2. Hence, in the present example, the calibration curve is reduced to:

$$v = \frac{t - 11.4}{4.2}$$

Both $k_1$ and $k_2$ will vary according to the ambient temperature, and $k_2$ will also vary according to the relative humidity, since it is a function of the rate of evaporation of the liquid. As a result, in order to increase the accuracy of the measurement, it may be desirable to generate a family of calibration curves, which are applied as a function of the ambient conditions as measured by other appropriate sensors (not illustrated). Alternatively, a single set of values of $k_1$ and $k_2$ can be used, with attendant loss of accuracy if the ambient conditions are significantly different. It should be noted that this calibration curve fits the data with extremely high precision, giving an $R^2$ value of 0.9994 with a linear fit. Other liquids may produce non-linear calibration curves.

Such a calibration curve-based calculation is significantly simpler to apply than a calculation a priori based on integration, and does not need a priori knowledge of specific heat capacities and latent heats of vaporisation of the liquid being measured. Furthermore, if the sensor is required to measure the volume of samples of different liquids, at least one calibration curve may be generated for each liquid, and the controller for the sensor 1 applies the correct calibration curve, either following a manual input, or an output of a sensor which determines which type of liquid is present. Also, it is worth noting that even if the temperature measured is not exactly the same as that of the surface 3 but is merely correlated thereto, a calibration curve method automatically takes this into account and any temperature difference between the surface 3 and the measured temperature does not need to be manually accounted for.

Since the method described above results in the complete evaporation of the sample, the sensor 1 is immediately ready to receive a further sample, which is not possible with the non-evaporative method of US2014/208824.

As mentioned above, over repeated measurements the presence of solid solutes in the liquid 5 may reduce the accuracy of the sensor 1, which will periodically require cleaning, or replacement of an interchangeable surface 3.

The same sensor 1 can also be used for continuous flow rate measurements, when the sensor 1 is arranged in such a manner that fluid is introduced onto its surface 3 in a substantially continuous manner, for instance by capillary action, a microfluidic pump, or similar. As a result, the sensor 1 is suitable for verifying a flow rate provided by a microfluidic pump, amongst other roles. Even though the approximate range of the flow rate in question may be known, the exact flow rate is unknown.

In one variant of such a flow rate measurement, the sensor 1 is operated as described above for discrete volume measurements, with periodic heating pulses which are sufficiently long and powerful to ensure that the surface 3 of the sensor 1 is dried during each pulse, and the power P can be determined as required to fulfil these conditions. This is illustrated on the graph of FIG. 6, which differs from that of FIG. 3 in that a single temperature curve T is illustrated, and multiple heating pulses are present, separated by sufficient time to allow the sensor 1 to return to substantially ambient temperature.

Figure 6:
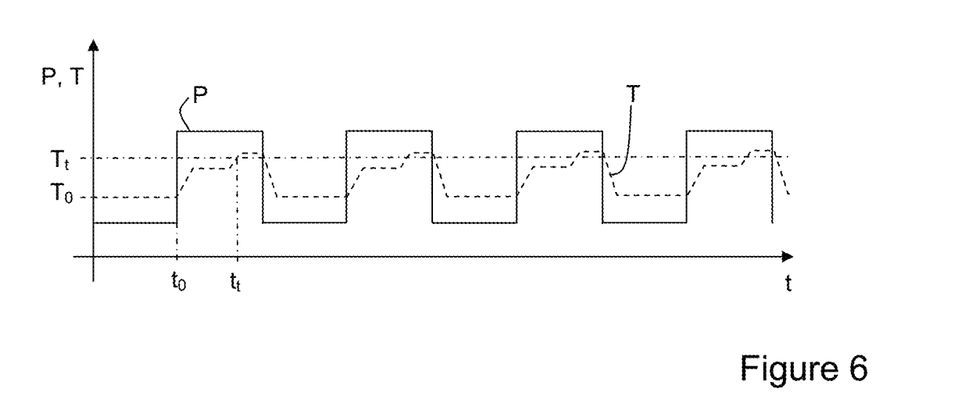
FIG. 6: a schematic graph representing an embodiment of the method of the invention as applied to flow rate measurements.

Since the volume of liquid 5 on the sensor 1 is being added to constantly, an integration-based calculation of flow rate from first principles is difficult, and hence a calibration-curve-based method is preferred.

Figure 7:
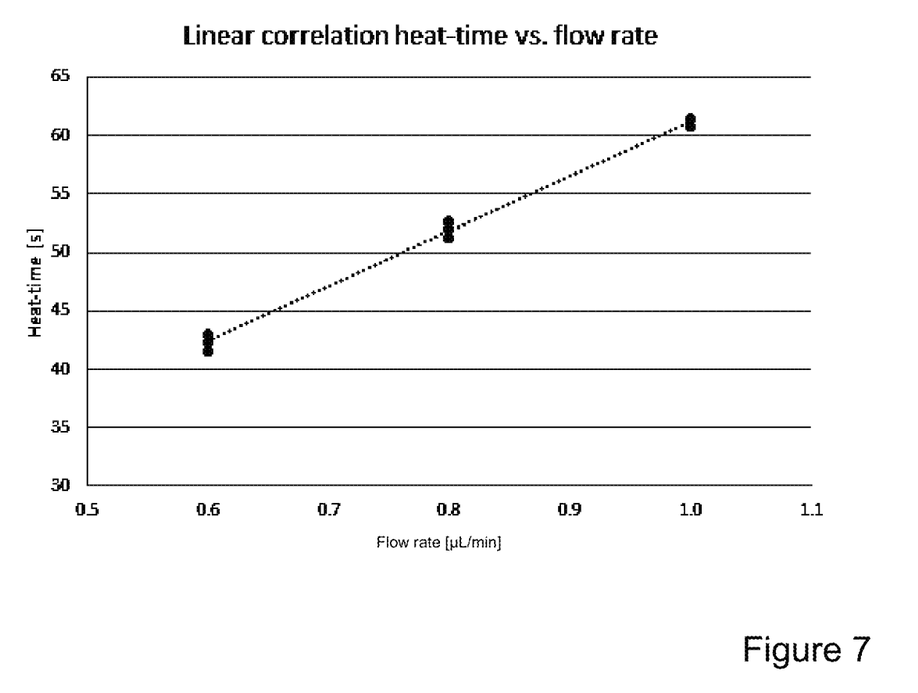
FIG. 7: a graph of a calibration curve obtained using the method illustrated in FIG. 6.

FIG. 7 illustrates the calibration curve obtained with flow rates of 0.6, 0.8 and 1.0 µL/min, and the time from $t_0$ to $t_t$ (i.e. from the start of the pulse to the temperature reaching threshold temperature $T_t$) within each heating pulse. Each flow rate has three data points from three different tests, illustrating the excellent reproducibility of the system and method.

In a similar manner as before, the flow rate $\dot{v}$ is given in this example by $$\dot{v} = \frac{t - k_3}{k_4}$$

wherein $\dot{v}$ is flow rate in µL/min, and $t=t_t-t_0$.

And by inserting the measured values for k3 and k4 obtained from the graph, we arrive at:

$$\dot{v} = \frac{t - 14}{47.2}$$

Again, the values of $k_3$ and $k_4$ can be determined for different sets of ambient conditions (temperature, relative humidity, pressure . . . ).

It should be noted that the type of conduit used to bring liquid to the surface 3 of the sensor 1, and hence when determining the calibration curve, the sensor and all its associated elements should be set up as they will be used in reality. For instance, if a 1 cm length of wicking material will be used as a conduit to bring fluid to the surface of the sample, then this should also be used during calibration, the calibrated flow rate of liquid (e.g. from a micropump, a syringe or similar) being applied to the wicking fabric as similarly as possible to how it will be applied in use. Also, it should be noted that the previous comments regarding exactly where the temperature is measured when using a calibration curve method apply equally to volumetric measurements, which perfectly illustrates the inherent practicality of such a method.

Figure 8:
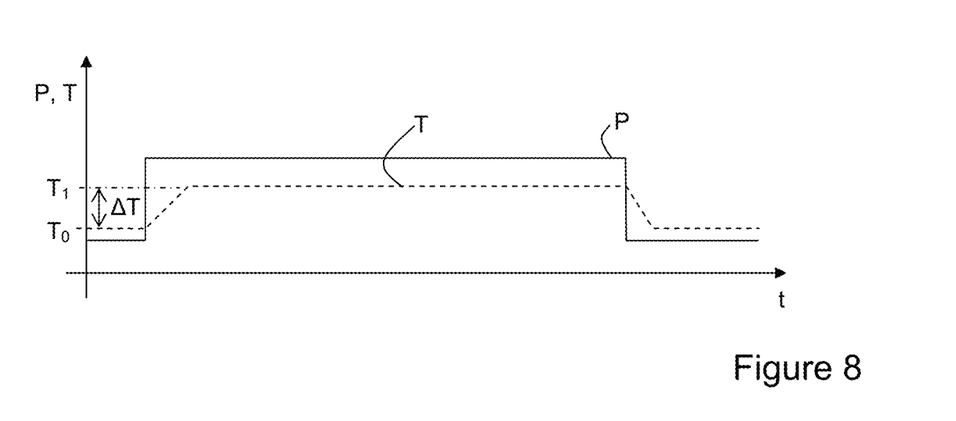
FIG. 8: a schematic graph representing a further embodiment of the method of the invention as applied to flow rate measurements.

FIG. 8 illustrates a further manner in which the sensor can be used as a flow sensor. In this variant, rather than applying power P in a pulsed fashion, it is applied constantly. In this variant, the surface 3 of the sensor remains wet, and the temperature attained $T_1$ and/or the change in temperature $\Delta T$ at equilibrium varies in function of the flow rate, and the power P is predetermined in function of the expected flow rate and the properties of the liquid being measured.

Since a higher flow rate results in more cooling of the sensor 1, higher flow rates result in a lower equilibrium temperature $T_1$ and vice-versa. It should be noted that the equilibrium temperature in this embodiment is obtained with the surface 3 being wet, and is not a dry equilibrium temperature as described in relation to FIG. 3.

From this value $T_1$ and/or the change from the initial temperature $T_0$, the flow rate can be determined a priori or by means of a calibration curve in a manner similar to that described above.

As an alternative to a fixed, predetermined power P, this latter can be adjusted to ensure that the surface 3 of the sensor 1 remains wet, for instance by being reduced if the temperature rises suddenly in such a manner as to indicate that the sensor 1 is dry. A further variant involves adjusting power P to maintain a predetermined temperature $T_1$. In all of these cases, the flow rate of liquid can be determined either a priori by calculation or by means of calibration curves based on the values of P and $T_1$ (or $\Delta T$) as appropriate, optionally taking into account the ambient temperature and/or pressure and/or relative humidity. In such a case, appropriate dedicated sensors can be provided.

Figure 9:
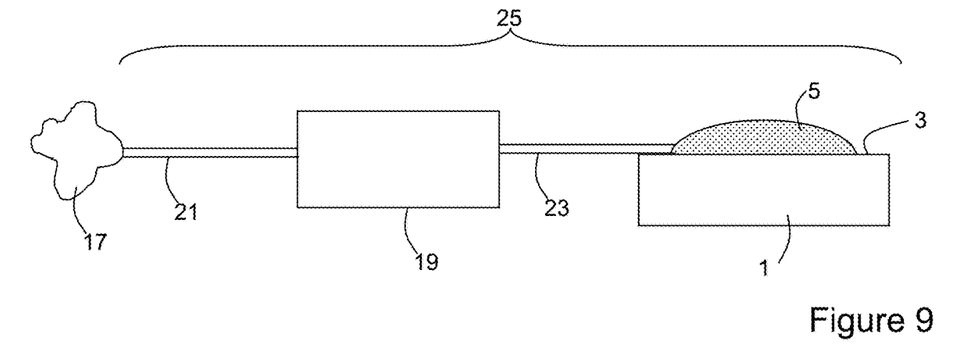
FIG. 9: a schematic representation of a microfluidic measurement system applying the method of the invention for measuring fluid flow rates.

FIG. 9 illustrates a further application of the sensor 1 according to any of the above-mentioned embodiments, as part of a microfluidic measurement system 25 based on the method of the invention. It should be noted that any system incorporating the sensor 1 and applying a method according to the invention can be referred to generically as a "sensor system".

This system 25 takes liquid from a source 17, which may be for instance a sample of liquid in a test tube, the sweating skin of a person, or any other source, and carries it via a first conduit 21 to an input of an analysis sensor 19. This sensor may be of any convenient type, e.g. adapted to perform a biological or chemical assay, to detect particular chemical species, or similar. The output of the analysis sensor communicates with the surface 3 of the sensor 1 via a second conduit 23, so as to create a liquid pathway from the source 17, via the analysis sensor 19, to the sensor 1. These conduits may, for instance, be one or more capillary tubes, a wicking fabric, or similar. In the case of a wicking fabric, this can be enclosed in an impermeable sheath to prevent lateral evaporation from its structure.

As a result of the construction of this system 25, the sensor 1 of the invention not only provides a measurement of the flow rate of liquid through the analysis sensor 19 by means of its accompanying circuitry (not illustrated in this figure), but also helps to draw the liquid through it without the need for a microfluidic pump. Conventionally, in the absence of a pump, the measurements provided by the analysis sensor 19 will start to drift since the liquid is not being continually and positively drawn through and thus the analysis sensor 19 is not flushed through, and hence cannot clear itself properly. This leads to buildups of analytes in the analysis sensor 19, which use of the system of the invention prevents while also providing flow rate measurements which may be useful in combination with the results provided by the analysis sensor 19.

Figure 10:
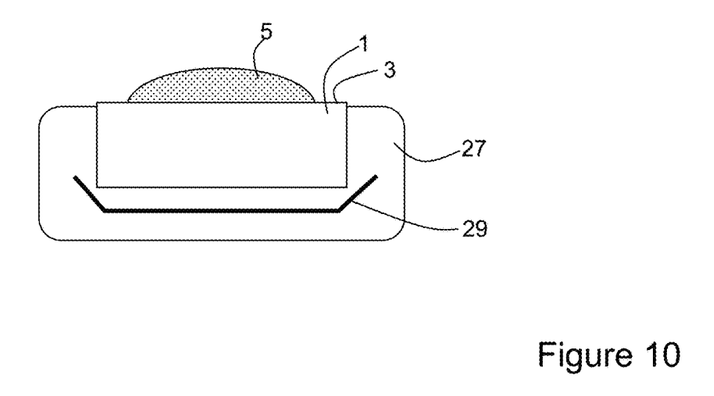
FIG. 10: a schematic representation of the sensor of FIG. 1 or 2, provided with several enhancements.

FIG. 10 illustrates a sensor 1 according to the invention, again according to any of the above-mentioned embodiments, which in this case embedded in a low thermal conductivity material 27 such as a ceramic, a glass, a glass-ceramic, a polymer or similar, so as to reduce heat loss and to ensure that all of the power P applied thereto is directed towards the liquid 5 on the exposed surface 3 of the sensor 1. Additionally or alternatively, an infrared reflector 29 may be provided so as to minimise heat loss in the direction away from the surface 3 for receiving the liquid 5.

Figure 11:
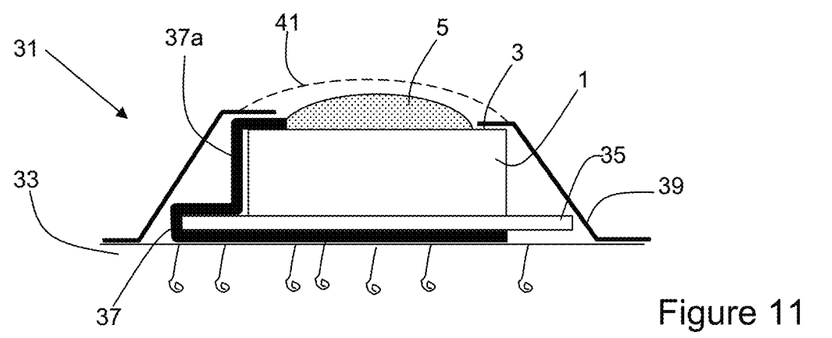
FIG. 11: a schematic representation of a sweat rate sensor incorporating the sensor of FIG. 1, 2 or 10, and which apply the method of the invention.

FIG. 11 illustrates a sweat rate sensor 31 incorporating a sensor 1 according to the invention, intended to be placed upon the skin 33 of a wearer.

The sensor 1 is situated upon an insulating element 35, adapted to prevent the heat of the sensor 1 from heating the skin 33 to the degree that it becomes uncomfortable. This insulating element 35 may be of plastic, ceramic, glass, glass-ceramic, fabric, or a combination thereof. Furthermore, an infrared reflector 29, as described above, may also be provided between the sensor 1 and the skin 33.

In order to collect sweat from the skin 33 and transport it to the exposed surface 3 of the sensor 1, a wicking fabric element 37 is provided between the insulating element 35 and the skin 33, and is in contact with the latter. The wicking fabric element 37 comprises at least one wicking pathway 37a leading around the sides of the sensor 1 to its exposed surface 3, so as to transport excreted sweat thereto. This construction minimises evaporative loss from the wicking fabric element 37, and results in a particularly compact structure. Alternatively, the wicking fabric element 37 may extend to the side of the sensor 1, which results in a less compact sweat rate sensor 31 in terms of the area of skin it occupies.

In order to prevent evaporative loss of sweat on its way to the surface 3, a substantially impermeable cover 39 at least partially seals the sweat rate sensor 31 to the skin 33. This cover 39 may for instance be made of a flexible polymer, silicone rubber or similar, and may be omitted if sweat losses are trivial.

The sweat rate sensor 31 can be affixed to the skin of a person e.g. by means of a strap, or an adhesive support similar to that used for venous catheters, but sized to surround the sweat rate sensor 31. Such an adhesive support may also serve as the cover 39, so as to attach the sweat rate sensor 31 to the skin of a wearer.

Once sweat produced by the sweat glands in the skin 33 has reached the surface 3 of the sensor 1, this latter can be operated according to one of the methods described above so as to provide measurements of the rate of sweating. The capillary pressure caused by the heated surface 3 and the continuous evaporation of the sweat 5 continuously draws the sweat from the skin 33 to the surface 3.

Furthermore, in order to prevent air movements (originating e.g. from wind or resulting from movements of the wearer) from affecting the rate of evaporation of the liquid 5, an optional semipermeable membrane 41 may be provided. Such a membrane may be made of Gore-Tex® (porous polytetrafluoroethylene) or similar material which allows water vapour to pass through, but is substantially impermeable to liquid water. As a result, forced evaporative cooling is reduced, and the evaporation rate is rendered substantially independent of air flows adjacent to the sensor 1. This membrane 41 may be bonded to the cover 39, or may be bonded to the sensor 1, e.g. to its surface 3 or to its outer wall. A passage for the conduit 37 may be provided if needed.

This sweat rate sensor 31 may also comprise a analysis sensor interposed in the fluid pathway between the skin and the surface 3, in the manner disclosed in reference to FIG. 9.

Although the invention has been described in terms of particular embodiments, various modifications are possible without departing from the scope of the invention as defined in the appended claims.

The invention claimed is:

1. A method for liquid measurements relating to an unknown volume or an unknown flow rate, the method comprising:
    providing a sensor (1) comprising a sensor surface (3) arranged to receive a liquid (5) thereupon, an electrical heating element (7) arranged to heat said surface (3), and an arrangement (11, 13; 7, 15) for measuring a temperature of said sensor surface (3);
    receiving liquid (5) on said sensor surface (3);
    heating said sensor surface (3) by means of said electrical heating element (7) at a known rate (P) while taking a plurality of temperature measurements (T) of said sensor surface (3) in function of time (t), said heating being at an absolute temperature of at least 90% of the boiling point ($T_b$) of said liquid (5) under ambient pressure;
    deriving a volume measurement or a flow rate measurement of the unknown volume or the unknown flow rate related to said liquid (5) from said electrical heating rate (P) and said temperature measurements (T).

2. The method according to claim 1, wherein said electrical heating element (7) is provided with a predetermined electrical current (I) from a power source (9).

3. The method according to claim 1, wherein said temperature is measured by measuring the electrical resistance of said electrical heating element (7).

4. The method according to claim 3, wherein said electrical resistance is measured by providing a known current (I) to said electrical heating element while measuring the voltage drop thereacross, the resistance being calculated by Ohm's Law.

5. The method according to claim 1, wherein said heating is carried out as a series of heating pulses of predetermined duration.

6. The method according to claim 5, wherein said predetermined duration is sufficiently long to dry said sensor surface.

7. The method according to claim 1, wherein said heating is carried out by applying power at a predetermined rate (P) insufficient to dry said sensor surface, the flow rate measurement being derived from a steady state temperature (T) measured.

8. The method according to claim 1, wherein said heating is carried out by applying electrical power at a rate (P) insufficient to dry said sensor surface, wherein electrical power is applied to maintain a predetermined steady state temperature (T), the flow rate measurement being derived from a measurement of said electrical power (P) applied.

9. The method according to claim 1, wherein said deriving step derives the flow rate measurement of the unknown flow rate from said electrical heating rate (P) and said temperature measurements (T) of the sensor surface (3).

10. The method according to claim 1, wherein said deriving step derives the volume measurement of a volume of a droplet from said electrical heating rate (P) and said temperature measurements (T) of the sensor surface (3).

11. A sensor system (25; 31) adapted to carry out the method of claim 1, comprising:
    a sensor (1) comprising a sensor surface (3) adapted to receive a quantity (5) of fluid thereupon, said sensor (1) comprising an electrical heating element (7) arranged to be connected to a source of electrical power (9) and an arrangement for measuring temperature (11, 13; 7; 15);
    a conduit (21, 23; 37) adapted to collect a liquid sample and to transport said liquid sample to said sensor surface (3).

12. The sensor system (25; 31) according to claim 11, wherein said arrangement for measuring temperature (7, 15) comprises said electrical heating element (7).

13. The sensor system (25; 31) according to claim 11, wherein at least a part of said conduit (21, 23; 37) comprises a wicking fabric arranged to be sandwiched between said sensor (1) and a skin surface (33) of a wearer.

14. The sensor system (25; 31) according to claim 13, wherein said conduit (21, 23; 37) extends around a peripheral wall of said sensor (1) so as to form at least one fluid pathway leading to said sensor surface (3).

15. The sensor system (25; 31) according to claim 13, further comprising a substantially impermeable cover (39) arranged to at least partially seal said sensor system (25; 31) to said skin surface (33).

16. The sensor system (25; 31) according to claim 15, wherein said cover (39) is at least partially self-adhesive.

17. The sensor system (25; 31) according to claim 11, further comprising an analysis sensor (19) in fluid communication with said conduit and arranged such that said liquid passes through said analysis sensor (19) on its way to the sensor surface (3) of the sensor (1).

18. The method according to claim 1, wherein in said providing the sensor step, a temperature sensor is provided and in said heating said surface (3) step, the plurality of temperature measurements (T) are taken on the sensor surface (3) of the temperature sensor.

19. The method according to claim 18, wherein in said providing the sensor step, the temperature sensor that is provided is a thermistor and in said heating said surface (3) step, the plurality of temperature measurements (T) are taken on the sensor surface (3) of the thermistor.

\* \* \* \* \*